United States Patent [19]

Simmons

[11] 3,809,862

[45] May 7, 1974

[54] OVEN TEMPERATURE CONTROL
[75] Inventor: Russell T. Simmons, Morrison, Ill.
[73] Assignee: General Electric Company, Fort Wayne, Ind.
[22] Filed: Oct. 16, 1972
[21] Appl. No.: 297,977

Related U.S. Application Data
[62] Division of Ser. No. 182,453, Sept. 21, 1971.

[52] U.S. Cl................... 219/512, 337/140, 337/395
[51] Int. Cl............................................. H05b 1/02
[58] Field of Search ........... 337/139, 140, 395, 366; 219/512

[56] References Cited
UNITED STATES PATENTS

| 388,505 | 8/1888 | Petit et al. ......................... 337/395 |
| 1,967,359 | 7/1934 | Hanel.................................. 200/113 |
| 2,166,498 | 7/1939 | Lacey ................................ 290/38 |
| 2,714,799 | 8/1955 | Skrobisch .......................... 60/23 |
| 2,896,163 | 7/1959 | Baker................................. 324/106 |
| 1,783,474 | 12/1930 | Hotchkiss .......................... 337/138 |
| 2,190,276 | 2/1940 | Smith................................. 200/138 |
| 2,897,320 | 7/1959 | Patti................................... 200/138 |
| 2,806,907 | 9/1957 | Mazzola............................. 200/5 |
| 3,176,099 | 3/1965 | Bergsma .............. 200;337/113;126 |
| 2,877,333 | 3/1959 | Long et al....................... 219/512 X |
| 2,816,999 | 12/1957 | Fry..................................... 337/140 X |
| 3,633,143 | 1/1972 | Yoshimura......................... 337/366 |
| 3,483,360 | 12/1969 | Perry ................................. 219/572 |
| 3,585,365 | 6/1971 | Kircher.............................. 219/512 |

Primary Examiner—J. D. Miller
Assistant Examiner—Fred E. Bell

[57] ABSTRACT

A system for controlling the temperature of air in an oven. The system has heater means for heating the oven air, switching means for energizing and de-energizing the heater means, and a thermal-to-mechanical transducer including a spring biased taut wire disposed within the oven in thermal contact with the air. Coupling means connects means for coupling the thermal-to-mechanical transducer with the switching means whereby the heater means may be energized and de-energized in response to changes in the temperature of the air within the oven about the thermal-to-mechanical transducer. An electrical circuit for controlling the temperature of the oven and a method for operating the oven within a predetermined temperature range are also disclosed.

28 Claims, 9 Drawing Figures

OVEN TEMPERATURE CONTROL

CROSS REFERENCE TO RELATED APPLICATION

This application is a division of my copending application Ser. No. 182,453, filed Sept. 21, 1971.

BACKGROUND OF THE INVENTION

This invention relates generally to oven temperature controls and in particular to systems electrical circuits and methods for effecting operation of such oven temperature controls.

Heretofore, ovens have typically been temperature controlled through the use of one of three types of thermostats. One of these types has employed an electrically conductive wire housed within an oven chamber whose resistance changes substantially with changes in wire temperature. The variable resistant wire is coupled through a heating element to a source of electric current. As the temperature of the wire increases, the resistivity of the wire itself changes. The increase voltage drop across the wire produces a decrease in the voltage drop across the heating element which element is of fixed resistance. The heater is in thermal contact with one leg of a U-shaped, bimetal switch. A second heater in an independent circuit is in thermal contact with the other switch leg. The relative temperature of the two legs determines the positions thereof relative to one another and thus the relative position of the bimetal switch contacts.

Another type oven thermostat in use today employs a Bourdon tube which is resilient and filled with helium. At room temperature the tube has a slight arcuate shape but upon being heated the degree of curvature diminishes as the helium seeks to expand and the tube seeks to maximize its internal volume to accommodate an increased volume. Straightening of the Bourdon activates a relay in suspending energization of the oven heating element.

The third thermostat in prevalent use in controlling oven temperature is a differential rod and tube device. Here, one end of a quartz rod is secured within a stainless steel tube. Heating of the assembly causes the tube to expand more rapidly than the quartz rod causing switch contacts on the unsecured rod end and tube to separate and thereby de-energizes the oven heating element. The principle problem associated with each of the foregoing thermostatic devices has been that of expense arising from either the complexity of the device or from the materials utilized. This is a principle problem to which the present invention is directed.

Accordingly, it is an object of the present invention to provide an improved oven temperature control system.

Another object of the invention is to provide an improved method of controlling the temperatures of ovens and the like Yet another object of the invention is to provide an improved oven temperature control circuit.

SUMMARY OF THE INVENTION

In carrying out the above and other objects of the invention in one form, a system is provided for controlling the temperature of air in an oven. The system comprises heater means for heating the air, switching means for energizing and de-energizing the heater means, and a thermal-to-mechanical transducer including a spring biased taut wire disposed within the oven in thermal contact with the air. The system further includes coupling means for coupling the thermal-to-mechanical transducer with the switching means whereby the heater means may be energized and de-energized in response to changes in the temperature of the air within the oven about the thermal-to-mechanical transducer.

In another form, a circuit for heating and controlling the temperature of air confined within an oven chamber is provided. The circuit comprises a relay having a relay switch element and a conductive relay switch activating element. An electrical resistant heating element is disposed within the chamber and adapted to be connected to a source of electric current through the relay switch element. A conductive taut wire is disposed within the chamber and adapted to be connected to a source of electric current through the conductive relay switch actuating element.

According to another aspect of the invention, a method is provided for operating an oven having a gaseous medium therein within a predetermined temperature range. The method comprises the steps of (a) heating the gaseous medium by energizing heating means disposed within the oven; (b) heating a taut wire disposed within the oven and mechanically coupled with a spring biased movable plunger by thermal conduction from the heated gaseous medium thereby causing a movable plunger to move as the taut wire elongates; (c) de-energizing the heating means through passage of the plunger through a first position thereby terminating the heating of the gaseous medium; and (d) cooling the taut wire by thermal conduction from the wire to the gaseous medium thereby causing the wire to return the plunger to the first position as the taut wire contracts.

The above mentioned and other features and objects of this invention, as well as the manner of obtaining them, will become more apparent and the invention itself will be better understood by reference to the following description, taken in conjunction with the accompanying drawings, wherein:

DESCRIPTION OF THE PREFERRED EMBODIMENTS

Figure 3:
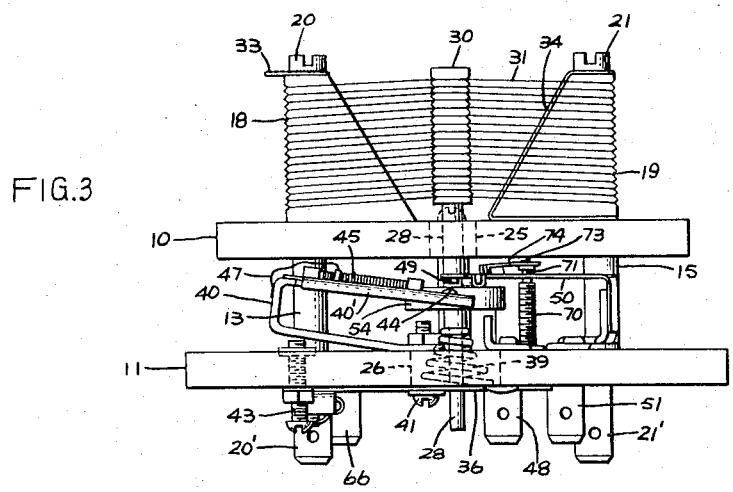
FIG. 3 is a front view in elevation of the thermostat shown in FIG. 1 dismounted from the oven.
Figure 4:
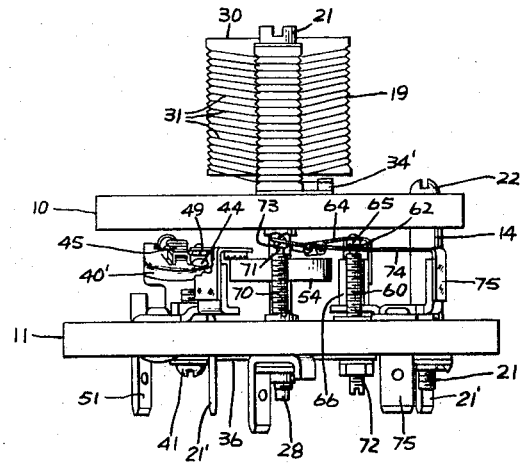
FIG. 4 is a side view in elevation of the thermostat shown in FIG. 3.
Figure 5:
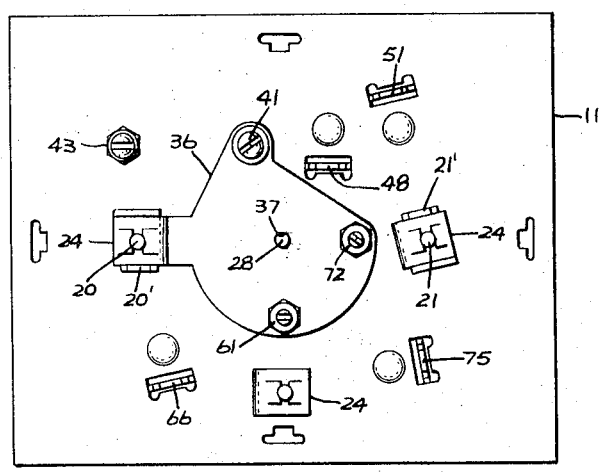
FIG. 5 is a plan view of the bottom of the thermostat shown in FIG. 3.

Referring now in detail to the drawings there is shown in FIGS. 3 and 4 a thermostat which may be used in practicing the invention is provided with an upper frame member 10 and a lower frame member 11 spaced from the upper frame member in parallel relation therewith by three hollow cylindrical spacers 13, 14 and 15, and each member is made from a ceramic material such as steatite, although other suitable materials could be used. Two ceramic posts 18 and 19 are mounted atop upper frame member 10 in spaced relation with one another, and each post has an aperture (not shown) therethrough which is axially aligned with a corresponding aperture (not shown) in frame members 10 and 11 during mounting. Mounting screws 20 and 21 are inserted through the apertures in the two frame members 10, 11 and through the two posts 18, 19 and hollow spacers 13 and 15. A third mounting screw 22 is likewise inserted through aligned apertures in the two frame members and hollow spacer 14. Three U-shaped spring or jam nuts 24 grip the ends of mounting screws 20, 21 and 22 projecting through the bottom of lower frame member 11 as seen in FIG. 5 thereby securing the two frame members and the two posts rigidly together. Terminals 20' and 21', which are electrically connected to mounting screws 20 and 21 respectively, project downwardly from lower frame member 11 where they are relatively accessible for coupling to external power.

Centrally located portions of frame members 10 and 11 define axially aligned apertures 25 and 26, respectively, through which metallic actuating plunger 28 of a motion translating means or mechanism passes. To the top portion of the actuating plunger 28 which projects above upper frame member 10 between posts 18 and 19 is mounted a ceramic wire spreader 30. A movable means or taut wire means, such as a conductive, thermally expandable wire 31 of Nichrome wire or the like is wound tautly about posts 18 and 19 and wire spreader 30. One end of the wire 31 is wrapped about the head of mounting screw 20 and secured to wire tab 33, and the other end of the wire is secured to a tab portion 34' of a wire clip 34, a portion of which is sandwiched between post 19 and upper frame member 10. In this manner wire 31 is electrically connected across terminals 20' and 21'.

As seen in the drawing, wire 31 is wound a number of times about the two posts 18, 19 and wire spreader 30 in forming several wire winding turns, and each contact point of the wire with the ceramic posts and spreader is respectively within a plurality of notches in the peripheral surface thereof. These substantially parallel notches in which wire 31 is seated may aid in maintaining the substantially parallel, mutual alignment of the wire turns and may also aid in preventing slippage of the wire over the ceramic surfaces. The presence of these notches however is purely optional. With many wire winding machines it is preferable to wind wire 31 about smooth posts and spreader surfaces after which the wire contact points may be cemented. With this configuration and assemblage wire 31, which is disposed substantially normal to actuating plunger 28, tends to maintain spreader 30 in a position between posts 18 and 19 where each segment of wire 31 spanning the posts is straight. With wire 31 taut any deviation from a linear disposition of the spanning wire biases spreader 30 in a direction substantially normal to the wire. It may be noted that movable means 31 and the motion translating means generally constitute a thermal-to-mechanical transducer.

To the bottom of lower frame 11 is secured an electrically conductive jumper plate 36 having an aperture 37 in axial alignment with apertures 25 and 26 in frame members 10 and 11, respectively. Through aperture 37 projects the lower extremity of plunger 28. A resilient means, such as a conical spring 39, of the motion translating means is disposed within aperture 26 about actuating plunger 28. The lower end of spring 39 is in abutment with jumper plate 36 while the upper end of the spring is in abutment with a radial step in the actuating plunger. When in compression, spring 39 applies a compressive force to actuating plunger 28 tending to move it upwardly as seen in FIGS. 3 and 4. As previously explained however upward movement of the plunger 28 is restrained by the multiple turns of wire 31 wound about wire spreader 30. Properly mounted, equilibrium of the forces acting upon plunger 28 is reached with the plunger positioned between posts 18 and 19 so as to place a slight bend in the spanning portions of wire 31 between the posts as shown in FIG. 3.

To lower frame member 11 beneath upper frame member 10 is mounted an oven temperature selector means such as a U-shaped power element 40, by means of screw 41 which also provides electrical connection between the power element and jumper plate 36. To one end of a pendant portion 40' of the power element 40 is secured switch contact 44. A portion of pendant portion 40' intermediate the ends thereof is divided into three lateral legs to the middle leg of which is secured an electrical heater element 45. One end of this heater element 45 is electrically connected to the metallic power element 40 by wire 47 while the other end thereof is electrically connected to terminal 48 by a conductive wire which, for clarity, is not shown. By elevating the temperature of the middle leg above that of the two outer legs pendant portion 40' is buckled thereby forcing switch contact 44 upwardly towards upper frame member 10. Screw 43 provides auxiliary means for manually calibrating the element.

Figure 7:
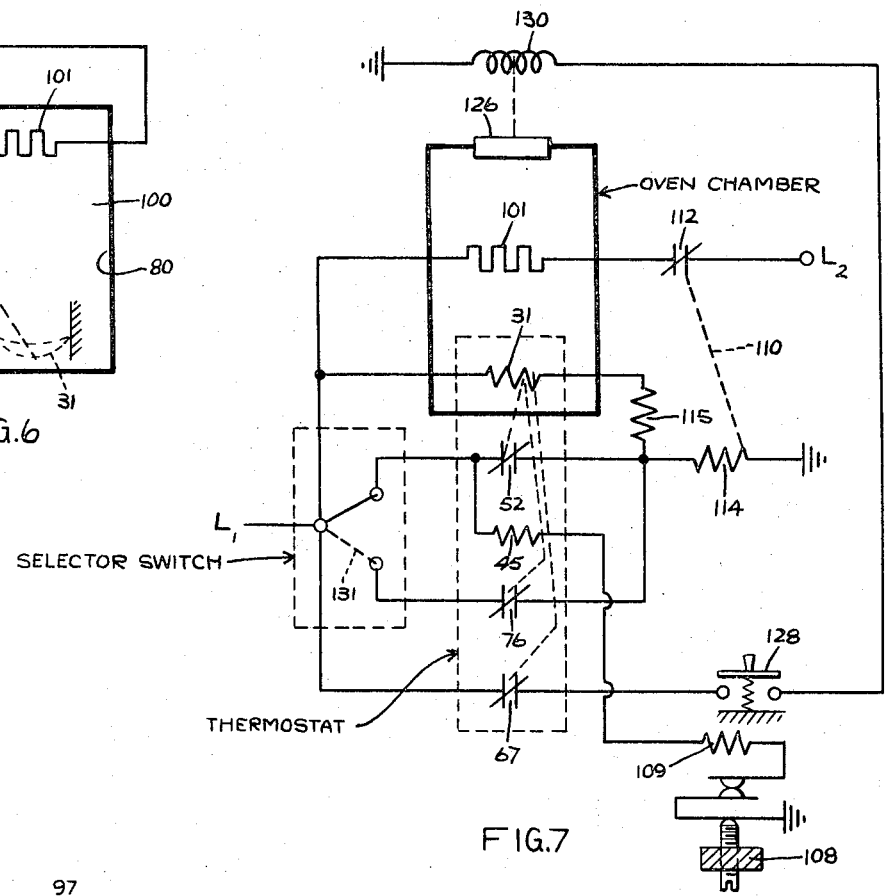
FIG. 7 is a schematic diagram in more detail of the system shown in FIG. 6.

Contact 49 is adapted to mate with contact 44 by being mounted on the distal end of an electrically conductive, resilient arm 50, which arm is in turn mounted to lower frame member 11 and electrically connected to a terminal 51. Contacts 49 and 44, which together form a switch or switch means 52 as schematically shown in FIG. 7, are normally closed when wire 31 is an unelevated temperatures. Resilient arm 50 is mounted above a centrally apertured ceramic ring 54, which ring is secured to actuating plunger 28 and may be considered as part of the plunger itself. As contact 49 is mounted to the free end of resilient arm 50, it may be moved upwardly towards upper frame member 10 by ring 54 should plunger 28 itself move upwardly.

In operation, as the temperature of wire 31 is elevated, the wire will elongate due to thermal expansion thereby permitting slight upward movement of the spreader 30 and plunger 28 in response to the force of spring 39 until force equilibrium is again established. At a point dependent upon the temperature setting established by the position of a control knob (not shown) and by the current flow through heater 45, contacts 44 and 49 will be separated by elongation of wire 31 thereby opening switch 52. The opening of switch 52 in turn terminates oven heating as will be subsequently explained in more detail.

With continued reference to FIG. 4 an adjust screw 60 is shown mounted to lower frame member 11 by means of a nut 61 in electrical connection with jumper plate 36. Switch contact 62 is mounted atop adjust screw 60. A resilient arm 64 having switch contact 65 secured to an end thereof is mounted to lower frame member 11 and electrically connected to terminal 66, a portion of which terminal projects through the lower frame member. Switch contacts 62 and 65 together form switch 67 as seen in FIG. 7. It should be noted that contact 62, which is immobile with respect to frame members 10 and 11, is disposed above contacts 44 and 49 nearer upper frame member 10 with resilient arm 64 between ring 54 and the upper frame member. This disposition provides for the separation of switch contacts 62 and 65 only after switch contacts 44 and 49 have already been opened by upward movement of ring 54 and actuating plunger 28 secured thereto. Thus, switch contacts 62 and 65 will not open with respect to switch contacts 44 and 49 until wire 31 has been elevated to a temperature above that which caused switch contacts 44 and 49 to open. This relative disposition of switches 52, 67 could, of course, be reversed if desired.

With continued reference to FIGS. 3 and 4, an adjust screw 70 having a switch contact 71 mounted atop thereof is also seen to be rigidly mounted to lower frame members 11 by a nut 72. Switch contact 73 is mounted to a free end of a resilient arm 74, which arm in turn is mounted to a terminal 75, a portion of which terminal extends through lower frame member 11. Switch contacts 71 and 73, which together form a switch 76 shown in FIG. 7, are disposed above switch contacts 62 and 65 closer to upper frame member 10 whereby they do not open until both switch contacts 44 and 49, as well as switch contacts 62 and 65, have been opened through elongation of wire 31 as previously explained.

Figure 1:
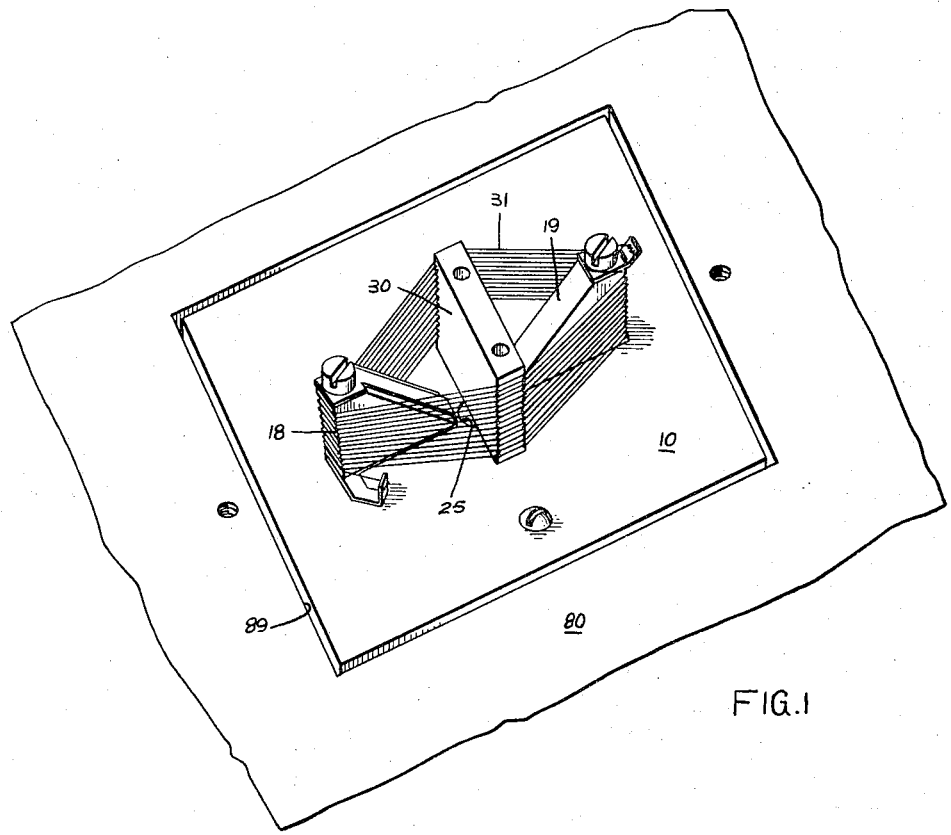
FIG. 1 is a perspective view of a portion of the interior surface of an oven wall having mounted thereto a thermostat which may be used in practicing the invention in one form.
Figure 2:
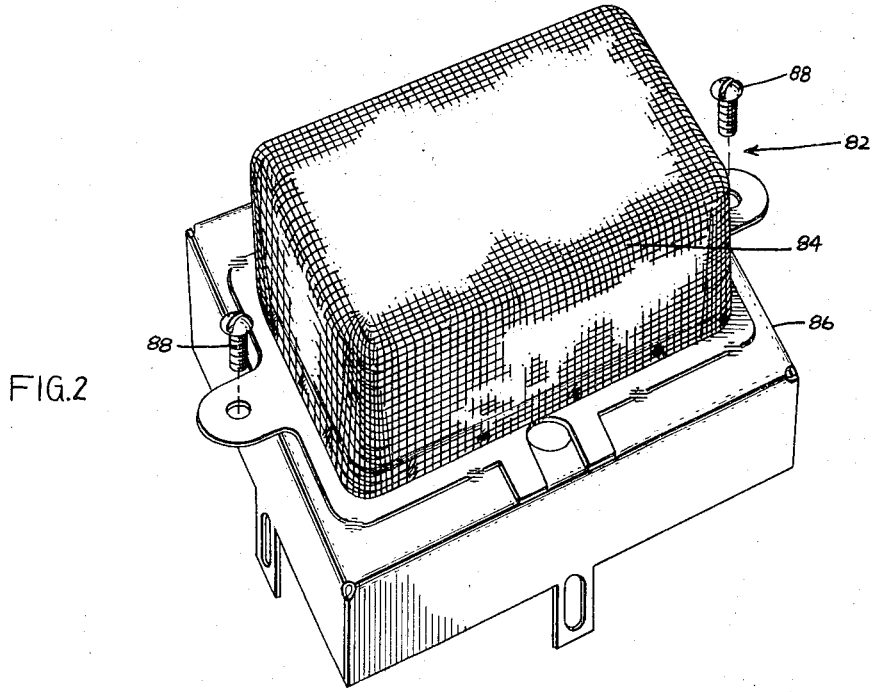
FIG. 2 is a perspective view of a shield adapted to be secured to an oven wall over that portion of the thermostat illustrated in FIG. 1 projecting into the oven chamber.

Referring now to FIGS. 1 and 2, the thermostat just described in detail is shown mounted in an oven with the upper surface of upper frame member 10 disposed substantially flush with an interior oven wall 80. So mounted, posts 18 and 19, wire spreader 30, and thermally expandable wire 31 project into the oven chamber itself in contact with the air or other gaseous medium located therewithin. The thermostat components disposed beneath the upper frame member 10 are thus not within the oven chamber and consequently are not exposed to the heated air therewithin. About the thermostat components disposed within the oven chamber is a shield 82 having a cup-shaped wire mesh screen 84 secured to a substantially imperforate base 86, which base in turn is secured to oven wall 80 by a plurality of screws 88 with a portion of the shield base projecting through an opening 89 between oven wall 80 and frame member 10. Shield 82 provides protection to the thermostat by inhibiting manual touching of wire 31 and its mounting assembly as well as inhibiting the accumulation of grease and the like thereon. The shield is, of course, optional as well as the particular mounting arrangement just described.

Figure 8:
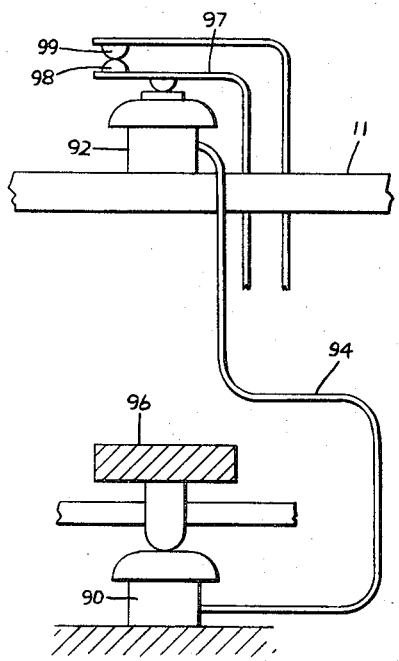
FIG. 8 is a schematic diagram of alternative means for manually selecting an oven temperature which may be substituted for the means shown in FIG. 3 as a component of the thermostat therein illustrated.

In FIG. 8 alternative means are illustrated for manually selecting operative oven temperatures which may be substituted for power element 40. This alternative means comprises two diaphragms 90 and 92 in internal fluid communication with one another by means of a connecting tube 94 which system is filled with a suitable hydraulic fluid. Selector screw 96 is mounted in contact with diaphragms 90 whereby manual turning of the screw depresses the diaphragm. When diaphragm 90 is so depressed, diaphragm 92 is forced upwardly against a resilient arm 97 thereby pressing a switch contact 98 upwardly against a mating switch contact 99, which two contacts form switch 52 shown in FIG. 7. This results in ring 54, which ring is secured to actuating plunger 28, having to be moved a greater distance upwardly towards upper frame member 10 before separation of contacts 98 and 99 occur to signal termination of oven heating.

Figure 6:
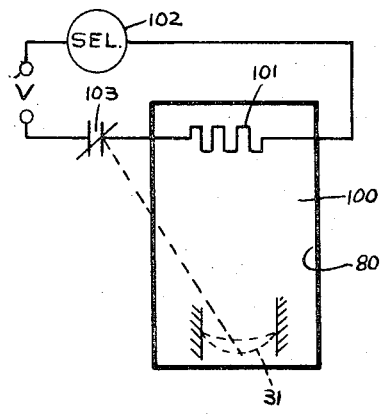
FIG. 6 is a schematic diagram of a system, presented for the purpose of describing the invention as embodied in one form, the system being useful for controlling the temperature of air in an oven which system may, if desired, utilize a thermostat of the type shown in FIG. 3.

FIG. 6 illustrates a system embodying the invention in one form, for controlling the temperature of air in an electrically heated oven, which system may, if desired, utilize the just described thermostat. Thermally expandable wire 31 is here seen to be mounted within chamber 100 bounded by interior oven walls 80. A means for heating the oven, such as an electrical heating element 101 or the like is also mounted within the oven chamber. When a selector switch 102 is positioned to an elevated oven temperature, heater element 101 is energized by closure of switch 103 placing the heater element across voltage V. As heating element 101 heats, the gaseous medium within chamber 100 adjacent the heating element also becomes heated by thermal conduction. As this occurs, that portion of the gaseous medium about wire 31 becomes also heated by thermal convection which in turn causes the temperature of wire 31 to become elevated by thermal conduction. As wire 31 is heated it expands. At a preselected temperature, plunger 28, indicated schematically by the dashed line, causes switch 103 to open thereby terminating the energization of heater element 101. With de-energization of heater 101, the gaseous medium in chamber 100 cools causing wire 31 to contract which in turn causes switch 103 to close. In this manner the temperature of the air in chamber 100 is controlled.

In FIG. 7 the system just described is shown in greater detail with additional system and circuit features which may utilize the multiple switches of the thermostat shown in FIGS. 3 and 4. The thermostat is seen to be mounted to the oven with thermally expandable wire 31 positioned within the oven chamber 100 and with thermostat switches 52, 67 and 76 positioned therewithout. The thermostat is electrically connected to power lines $L_1$ and $L_2$, each of which are preferably 110 VAC above ground and 220 VAC mutually across. System on/off switches are not shown for clarity. This system is adapted for 150° to 550° F oven operating temperatures, for a 600° F oven door safety interlock mechanism, and for a 900° F oven heat clean operation. These are conventional temperature ranges for present day oven operations. Other temperature ranges could, of course, be selected if desired.

In system operation, an oven operating temperature is manually selected by movement of a selector knob 108 with the selector switch in the position illustrated. This action causes pendant portion 40' in the thermostat of power element 40 to buckle as heater 45 rapidly warms simultaneously with the warming of heater element 109 of a matching three-legged power element (not shown) in series connection with heater 45 and in mechanical coupling relation with knob 108. Relay switch 112 of a means for controlling energization and de-energization of heating means 101, such as a relay 110 or the like, is closed by the rapid heating of a means for actuating the relay switch, such as a relay resistor 114 or the like thereby placing oven heating element 101 across $L_1$ and $L_2$. As the air temperature within the oven chamber rises, wire 31 expands thereby permitting acutating plunger 28 of the thermostat to move upwardly as viewed in FIG. 3. Continued upward movement of actuating plunger 28 causes ring 54 to contact and force upwardly resilient arm 50. Power element 40 follows this upward movement until its stable position is reached as determined in part by the current flowing through heater 45. Continued movement of resilient arm 50 causes switch contact 49 to separate from switch contact 44 to open switch 52. This is the relative position of the contacts actually shown in FIG. 3.

Figure 9:
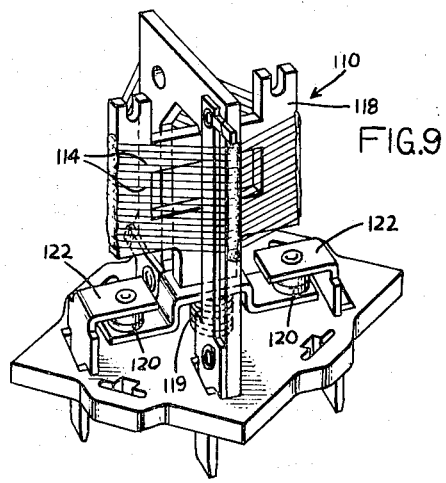
FIG. 9 is a perspective view of the relay schematically shown in FIG. 7 as a component of the system therein illustrated. Corresponding reference characters indicate corresponding parts throughout the several views of the drawings. The following examples illustrate the invention and are not to be construed as limiting in any manner.

With the opening of switch 52, wire 31 and current limiting resistor 115 connected thereto ar no longer shorted or electrically shunted by switch 52. Instead, they are connected in electrical relation or series circuit with relay wire 114 across $L_1$ and ground. This in turn produces a reduction the current flow or power available to relay wire 114 of relay 110 causing it to cool. As may be seen by reference to FIG. 9, cooling of wire 114 causes it to contract and a force movable wire mounting support 118 downwardly against a spring 119 forcing a pair of relay switch contacts 120 attached to support 118 also downwardly away from mating relay switch contacts mounted beneath a rigid arm 122. These contacts form relay switch element 112 shown in FIG. 7. The opening of switch 112 removes oven heater element 101 from across $L_1$ and $L_2$ thereby terminating current flow therethrough.

It maybe noted that the opening of switch 52 causes current to flow through thermally expandable wire 31 itself, which current flow causes the wire to be elevated in temperature above the temperature of air thereabout. This differential in temperature, which is of course determined by the resistance value of wire 31 itself and that of current limiting resistor 115, provides an oven temperature range differential. With the elevation of the temperature of wire 31 above that of the air thereabout, the temperature of the air must fall below that which initially caused switch 52 to open and terminate oven heat before the temperature of the wire has fallen sufficiently to reclose switch 52. The temperature differential between oven turn on and turn off is substnatially that of the temperature differential of wire 31 above air thereabout.

The circuit and system shown in FIG. 7 also includes oven heat clean means plus a safety interlock system to prevent manual opening of an oven door 126 when the oven is at a temperature of approximately 600° F. For the oven to function at heat clean temperatures a push button switch 128 must be closed for until this is done a solenoid 130 is mechanically positioned so as to prevent movement of an unshown lever from "cook" to "clean" position, which lever movement in turn locks oven door 126. With closure of push button switch 128 and thermostat switch 67, solenoid 130 is energized and thereby permitting movement of the aforementioned lever to the "clean" position. With the selector switch positioned as shown by dashed line 131 to a "clean" position, switch 52 is removed from the circuit. As a result the oven continued to heat beyond the upper cook temperature range limit of 550° F. At 600° F thermostat switch 67 opens as switch contacts 62 and 65 are separated by actuating plunger 28. Opening of switch 67 de-energizes solenoid 130 which in turn manually prevents oven door 126 from being opened as explained above. The oven continues to be heated until heat clean temperature is achieved at which point movement of thermostat actuating plunger 28 opens switch 76 causing current to flow through wire 31 which causes relay wire 114 to cool, as previously discussed, and actuates relay 110 causing switch 112 to open and de-energizing oven heating element 101. The oven will then cool until switch 76 is reclosed. The heat clean operation is performed with a temperature differential provided as in the case of normal oven cook operation.

While there has been described what at present is considered to be the preferred embodiments of the present invention, it will be obvious to those skilled in the art that various modifications may be made therein without departing from the true spirit and scope of the invention.

What I claim as new and desire to secure by Letters Patent of the United States is:

1. A system for controlling the temperature of air in an oven comprising heater means for heating said air, switching means for energizing and de-energizing said heater means, a thermal-to-mechanical transducer including a spring bias taut wire disposed within said oven in thermal contact with said air and in a first direction, and an actuating plunger mounted for movement substantially normal to the first direction and having a portion about which said taut wire is wound, and coupling means for coupling sid thermal-to-mechanical transducer with said switching means whereby said heater means may be energized and de-energized in response to changes in the temperature of said air within said oven about said thermal-to-mechanical transducer.

2. A method of operating an oven having a gaseous medium therein within a predetermined temperature range comprising the steps of:
   a. heating said gaseous medium by energizing heating means disposed within the oven;
   b. heating a taut wire disposed within the oven and mechanically coupled with a spring biased movable plunger by thermal conduction from said heated gaseous medium thereby causing said movable plunger to move as said taut wire elongates;
   c. de-energizing said heating means through passage of said plunger through a switch activation position thereby terminating the heating of the gaseous medium;
   d. passing electric current through said taut wire upon de-energization of said heating means to elevate the temperature of said taut wire above the temperature of said gaseous medium;

e. cooling said taut wire by thermal conduition from said wire to said gaseous medium thereby causing said wire to return said plunger to said first position as said taut wire contracts; and f. terminating the passage of the electric current through said taut wire upon the return of said plunger to said first position.

3. A system fo controlling temperature in an oven comprising means for heating the oven, means for controlling energization and de-energization of the heating means, switch means having a position for energizing the controlling means to effect energization of the heating means upon the selection of a desired oven temperature, means movable in response to oven temperature and adapted for connection in electrical relation with the controlling means to effect de-energization thereof and de-energization of the heating means, and means for translating motion of the movable means and actuating the switch means to another position connecting the movable means in electrical relation with the controlling means, the motion translating means being movable in response to movement of the movable means upon the attainment of the selected oven temperature to actuate the switch means from its first named position to its other position connecting the movable means and the controlling means in electrical relation thereby to de-energize the controlling means and the heating means.

4. A system as set forth in claim 3, wherein the resistance of the movable means is predetermined to limit power available to the controlling means thereby causing the de-energization thereof when the movable means and controlling means are connected in electrical relation.

5. A system as set forth in claim 3, wherein the de-energization of the heating means effects a reduction in the oven temperature, and the movable means being further movable in response to the reduction of the oven temperature to a predetermined value less than the selected oven temperature to effect return actuation of the switch means from its other position to the first named position thereof to re-energize the controlling means and the heating means and electrically disassociate the movable means from the controlling means.

6. A system as set forth in claim 3, wherein the resistance of the movable means is responsive to power supplied to the movable means to elevate the temperature thereof to a value in excess of the selected oven temperature when the movable means and controlling means are connected in electrical relation thereby to establish a differential between the elevated temperature of the movable means and the reduction of the oven temperature less than the selected oven temperature in response to the de-energization of the heating means, and the movable means being further movable in response to the reduced oven temperature of a predetermined value to effect return actuation of the switch means from its other position to its first named position to respectively re-energize the controlling means and the heating means and electrically disassociate the movable means from the controlling means.

7. A system as set forth in claim 3, wherein the movable means and motion translating means constitute a thermal-to-mechanical transducer means.

8. A system as set forth in claim 3, wherein the movable means comprises taut wire means disposed in heat transfer relation with the heating means and coupled with the controlling means for connection in electrical relation therewith.

9. A system as set forth in claim 8, wherein the taut wire means is disposed generally in a predetermined direction and engaged with at least a portion of the motion translating means, and the motion translating means being movable in another direction generally perpendicular to the predetermined direction.

10. A system as set forth in claim 9, wherein the motion translating means includes means for operating engagement with the switch means and upon which the taut wire means is disposed, and resilient means urging the operating means and taut wire means generally in the other direction.

11. A system as set forth in claim 10, wherein the taut wire means elongates in response to oven temperature, and the taut wire means and operating means being conjointly urged by the resilient means upon the elongation of the taut wire means to effect the actuation of the switch means to its other position.

12. A system as set forth in claim 3, wherein the motion translating means includes resilient means respectively opposing and assisting movement of the movable means upon the actuation of the switch means to its first named position and its other position.

13. A system as set forth in claim 3, wherein the controlling means comprises other switch means for energizing and de-energizing the heating means, and means for actuating the other switch means and for selective connection in electrical relation with the movable means and the first named switch means, the actuating means being selectively connected in electrical relation with the first named switch mean and the movable means when the first named switch means is in its first named and other positions and the actuating means being responsive to power supplied thereto to actuate the other switch means and effect the energization and de-energization of the heating means when the actuating means is selectively connected in electrical relation with the first named switch means and the movable means, respectively.

14. A system as set forth in claim 3, wherein the connection of the movable means in electrical relation with the controlling means is a series circuit connection.

15. A system as set forth in claim 3, wherein the switch means is in its first named position electrically shunts the movable means while supplying power to the controlling means.

16. A system as set forth in claim 3, wherein the movable means is electrically shunted by the switch means in its first named position and serially connected in electrical relation with the controlling means when the switch means is in its other position.

17. A method for controlling temperature in an oven comprising the steps of:

a. activating heating means by energizing control means therefor and thereby effecting heating of the oven to a selected temperature;

b. sensing oven temperature through a thermal-to-mechanical transducer having means for connection in electrical relation with the control means and movable in response to the attainment of the selected temperature to a displaced position; and c. connecting the movable means in electrical relation with the control means and applying power therethrough for effecting de-energization of the control means and thereby de-activating the heating means upon the movement of the movable means to its displaced position.

18. The method as set forth in claim 17, comprising the preliminary step of selecting the selected temperature and applying power to the control means for energizing it.

19. The method as set forth in claim 17, comprising the preliminary step of shunting the movable means from its connection in electrical relation with the control means prior to the movement of the movable means to its displaced position.

20. The method as set forth in claim 17, comprising the additional step of cooling the movable means by reducing the oven temperature to a predetermined value when the heating means is de-activated thereby causing the movable means to return to its original position, and terminating the application of power through the movable means upon the return thereof to its original position.

21. The method as set forth in claim 20, comprising the substantially simultaneous step of shunting the movable means from its connection in electrical relation with the control means for effecting re-energization thereof and thereby reactivating the heating means upon the return movement of the movable means to its original position.

22. The method as set forth in claim 17, wherein the connecting step further comprises actuating switching means from a normal position shunting the movable means and supplying power to energize the control means to a circuit making position for serially connecting the movable means in electrical relation with the control means by the movement of the movable means to its displaced position.

23. The method as set forth in claim 22, comprising the additional step of cooling the movable means upon de-activating the heating means thereby causing the movable means to return to its original position further effecting actuation of the switching means from its circuit making position to its normal position.

24. The method as set forth in claim 17, comprising the preliminary step of predetermining the electrical resistance of the movable means for effectively limiting the amount of power available to the control means when it is connected in electrical relation with the movable means thereby causing the de-energizing of the control means for de-activating the heating means.

25. The method as set forth in claim 17, wherein the connecting step further comprises elevating the temperature of the movable means to a value in excess of the selected temperature upon the connection thereof in electrical relation with the control means and reducing the oven temperature to a value less than the selected temperature upon de-activating the heating means thereby establishing a temperature differential causing cooling of the movable means and resulting in return movement thereof from its displaced position to its original position for electrically disassociating the movable means from the control means and for re-energizing it and reactivating the heating means.

26. The method as set forth in claim 17, wherein the movable means comprises taut wire means, and wherein the sensing step further comprises elongating the taut wire means in response to oven temperature for effecting movement of the taut wire means to the displaced position.

27. The method as set forth in claim 26, wherein the transducer further includes motion translating means engaged with the taut wire means and movable in a direction generally normal thereto, and wherein the sensing step further comprises moving the motion translating means in response to the elongating of the taut wire means for actuating switching means to effect the function of the connecting and applying step.

28. A control circuit for an electrical resistant heating means of an oven comprising relay means for connecting the heating means in circuit across a power supply thereby to heat the oven including conductive relay energizing means, switch means connected in a series circuit with the relay energizing means, said switch means being operable upon the selection of an oven operating temperature to supply current to the relay energizing means thereby to energize the relay means and connect the heating means in circuit across the power supply, means including movable means disposed in heat transfer relation with the heating means and connected in a shunt circuit across the switch means and in series circuit with the relay energizing means, and means movable with the movable means for actuating the switch means, the movable means being responsive to the selected oven operating temperature to drive the actuating means and actuate the switch means to a position interrupting current flow therethrough to the relay energizing means and establishing current flow through the shunt circuit and movable means to the relay energizing means, and the resistance of the shunt circuit being great enough to limit the current flow therethrough to a value causing the relay energizing means to de-energize the relay means thereby to open the circuit across the power supply to the heating means.

* * * * *

UNITED STATES PATENT OFFICE
CERTIFICATE OF CORRECTION

PATENT NO. : 3,809,862
DATED : May 7, 1974
INVENTOR(S) : Russell T. Simmons

It is certified that error appears in the above-identified patent and that said Letters Patent are hereby corrected as shown below:

Col. 1, line 11, after "systems" insert --,--.
Col. 3, line 45, after "which" insert --an operating means or--.
Col. 4, line 41, after "means" (first occurrence) insert --,--;
      line 65, delete "an" and insert --at--.
Col. 6, line 47, after "temperature," insert --expansion of wire 31 through--.

same line, after "40" insert --in the thermostat--;
      line 16, after "like" insert --,--;
      line 31, delete "ar" and insert --are--;
      line 48, delete "maybe" and insert --may be--;
      line 68, after "temperatures" insert --,--.
Col. 8, line 7, delete "and";
      line 11, delete "continued" and insert --continues--;
      line 46, delete "sid" and insert --said--;
Col. 10, line 51, delete "is".

Signed and Sealed this twenty-ninth Day of July 1975

[SEAL]

Attest:

RUTH C. MASON
*Attesting Officer*

C. MARSHALL DANN
*Commissioner of Patents and Trademarks*